T. H. SIDDALL.
GEARING.
APPLICATION FILED MAR. 17, 1913.
1,160,537.
Patented Nov. 16, 1915.
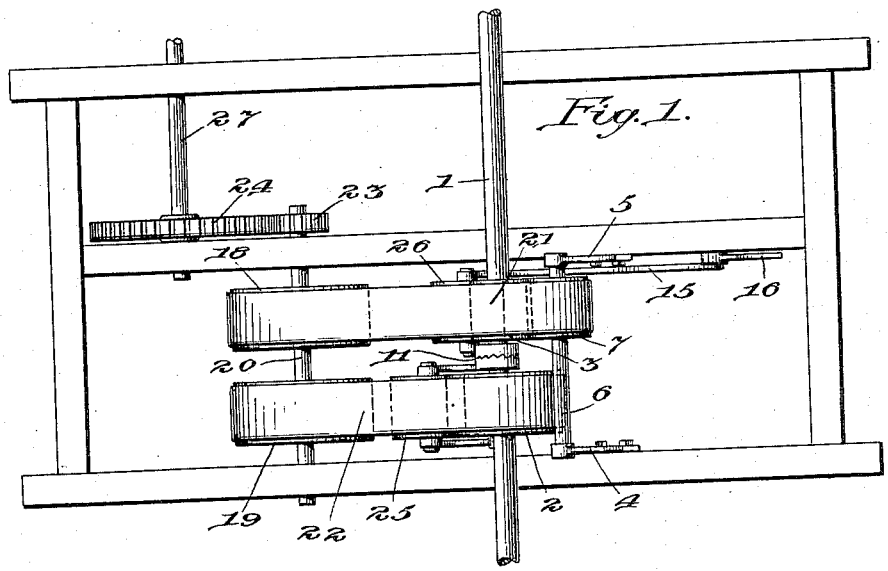
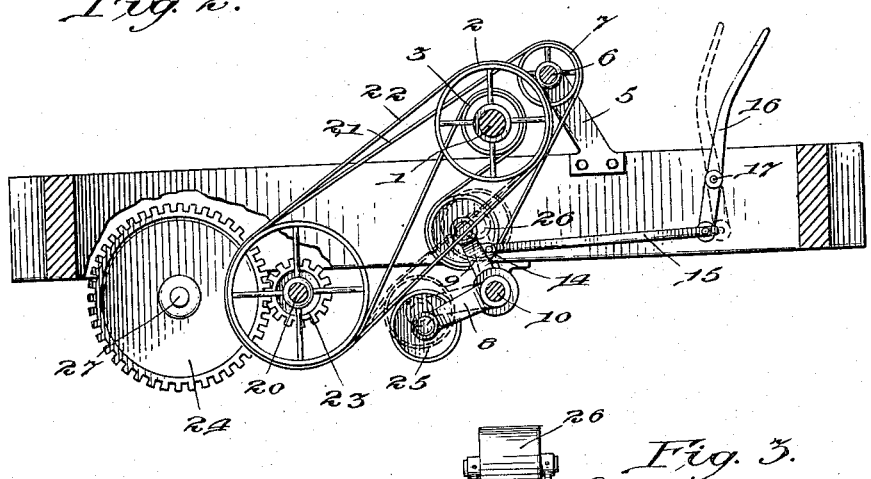
Inventor
Thomas H. Siddall.
Witnesses
By
Attorney
COLUMBIA PLANOGRAPH CO., WASHINGTON, D. C.

UNITED STATES PATENT OFFICE.

THOMAS HENRY SIDDALL, OF SUMTER, SOUTH CAROLINA, ASSIGNOR TO THE SUMTER MACHINERY CO., OF SUMTER, SOUTH CAROLINA, A CORPORATION OF SOUTH CAROLINA.

GEARING.

1,160,537.   Specification of Letters Patent.   Patented Nov. 16, 1915.

Application filed March 17, 1913. Serial No. 754,840.

*To all whom it may concern:*

Be it known that I, THOMAS HENRY SIDDALL, a citizen of the United States, residing at Sumter, in the county of Sumter and State of South Carolina, have invented certain new and useful Improvements in Gearing, of which the following is a specification, reference being had to the accompanying drawing.

My invention relates to improvements in gearing, and consists mainly in an improved arrangement and construction of the belt tightener used in the gearing described in Letters Patent of the United States granted to me February 28th, 1911, No. 985,463.

The objects of the present invention are, to arrange the tightener mechanism so it will work on the slack instead of tight sides of the belts, to lessen the strain on the belts, to simplify the shift frame and render the shifting process easier, and to enable the slack to be taken out of the belts without cutting same, by adjustment of the pulleys on the shift frame.

While I describe the invention as applied to a saw mill feed works, it will be understood that it may be employed elsewhere; and I do not limit myself to the precise construction herein disclosed as it is obvious that modifications may be made by those skilled in the art without departing from the invention herein claimed.

The accompanying drawings illustrate the invention as applied to a saw mill feed works.

Figure 1 is a plan view of that portion of a saw mill feed works necessary to illustrate my invention. Fig. 2, a view of the feed works, partly in section, and Fig. 3, a detail of the shift frame.

Like figures of reference denote the same parts wherever they are shown.

1 is a saw mandrel suitably supported, and having the usual driven pulley (not shown) on either end, and the driving pulleys 2 and 3 for the forward and reverse belts 21 and 22. Behind this mandrel are the supports 4 and 5 carrying shaft 6 supporting an idler pulley 7 for the forward belt 21.

The tightener frames 8 (for reverse tightener pulley) and 9 (for forward tightener pulley) are swung on shaft 10 below mandrel 1. These frames have teeth as shown at 11 on adjacent ends of their hubbed portions, which lock together making them practically one structure with the shaft, the latter being threaded at both ends and locked by nuts 12 and 13 against the frames. These frames carry idler pulleys 25 and 26, and the frames may be adjusted around shaft 10 as an axis, thereby varying the radial position of the pulleys. This enables the slack to be taken out of the belts, thereby avoiding cutting them, otherwise necessary.

For operating the tightener frames either of them is provided with means such as the clevis 14 or other suitable means whereby the reach rod 15 is attached to the frames. To 15 is attached the sawyer's lever 16 suitably supported on the frame work at 17, permitting it to be moved from an intermediate position, forward as shown in solid lines Fig. 2, or reversing position as shown in dotted lines. This moves the tightener frames, bringing pulleys 25 or 26 in contact with the belts, depending upon the position of the sawyer's lever, thereby obtaining forward or reverse motion of shaft 20. Shaft 20 carries pulleys 18 and 19, which are driven by belts 21 and 22 depending upon which belt is brought into engagement by the tightener frame. The motion of 20 is transferred through gears 23 and 24, or in any other suitable manner, to the saw carriage, driven from shaft 27.

It will be observed that the pulley 25 is brought into service for reversing and 26 for forward motion, and that belt 22 passes around driving pulley 2 over tightener pulley 25 and around pulley 19. Forward belt 21 passes around driving pulley 3, over tightener pulley 26, around idler pulley 7 and around driven pulley 18. Any other arrangement of the belts that will permit the belt tightener to operate as intended may be employed.

I claim—

In a device of the character described, a suitable supporting frame, a driving shaft journaled in said frame, two pulleys mounted on said shaft, a driven shaft suitably positioned with respect to said frame, pulleys mounted on said driven shaft, an idler journaled in suitable supports carried by the frame, adjustable frames journaled to the lower portion of the supporting frame, idlers carried by said frames, a belt passing over one of the pulleys of the driving shaft and the driven shaft and over the first mentioned idler and around one of the idlers carried by the adjustable frames, a belt passing over the other pulley of the driving shaft and the driven shaft, and means for oscillating the adjustable frames to cause the idler to pull the first mentioned belt to tighten the same or to alternately force the other idler against the other belt.

In testimony whereof I hereunto affix my signature in the presence of two witnesses.

THOMAS HENRY SIDDALL.

Witnesses:
H. R. VAN DEVANTER,
A. H. STUBBS.